(12) United States Patent
Zhang

(10) Patent No.: US 11,541,462 B2
(45) Date of Patent: Jan. 3, 2023

(54) CUTTING INSERT, CUTTING TOOL, AND METHOD FOR MANUFACTURING CUTTING-MACHINED PRODUCT

(71) Applicants: KYOCERA Corporation, Kyoto (JP); Zhanlong Zhang, Dongguan (CN)

(72) Inventor: Zhanlong Zhang, Dongguan (CN)

(73) Assignee: KYOCERA Corporation, Kyoto (JP)

(*) Notice: Subject to any disclaimer, the term of this patent is extended or adjusted under 35 U.S.C. 154(b) by 161 days.

(21) Appl. No.: 16/641,113

(22) PCT Filed: Sep. 6, 2018

(86) PCT No.: PCT/CN2018/104371
§ 371 (c)(1),
(2) Date: Feb. 21, 2020

(87) PCT Pub. No.: WO2019/047894
PCT Pub. Date: Mar. 14, 2019

(65) Prior Publication Data
US 2020/0206827 A1  Jul. 2, 2020

(30) Foreign Application Priority Data
Sep. 6, 2017 (CN) .................. 201710800350.X

(51) Int. Cl.
*B23B 27/16* (2006.01)
*B23C 5/20* (2006.01)
*B23C 5/06* (2006.01)

(52) U.S. Cl.
CPC ............. *B23B 27/16* (2013.01); *B23C 5/20* (2013.01); *B23B 2200/202* (2013.01);
(Continued)

(58) Field of Classification Search
CPC ............. B23B 27/1611; B23B 27/164; B23B 27/1651; B23B 27/16; B23B 2200/165;
(Continued)

(56) References Cited

U.S. PATENT DOCUMENTS 6,142,716 A    11/2000  Jordberg et al.
2004/0131431 A1  7/2004  Satran
(Continued)

FOREIGN PATENT DOCUMENTS

CN    1315892 A    10/2001
CN    1655902 A    8/2005
(Continued)

*Primary Examiner* — Boyer D Ashley
*Assistant Examiner* — Stephen Sun Cha
(74) *Attorney, Agent, or Firm* — Volpe Koenig

(57) ABSTRACT

A cutting insert has: an upper surface; a lower surface; a side surface, having a first surface and a second surface disposed opposite each other between the upper surface and the lower surface; and a first cutting edge. The lower surface has a plurality of slots extending from a side of the first surface to a side of the second surface. In addition, when viewed from a side of the lower surface, if the angle between a ridge line on which the upper surface and the first surface intersect and an imaginary extension line of the plurality of slots is defined as $\theta 1$, and the angle between a ridge line on which the lower surface and the first surface intersect and the imaginary extension line is defined as $\theta 2$, then $\theta 2 > \theta 1$.

9 Claims, 15 Drawing Sheets

(52) U.S. Cl.
CPC .............. *B23B 2205/12* (2013.01); *B23C 5/06* (2013.01); *B23C 2210/0407* (2013.01)

(58) Field of Classification Search
CPC ........ B23B 2200/161; B23B 2200/167; B23B 2200/3627; B23B 2200/202; B23B 2205/12; B23C 2200/165; B23C 2200/161; B23C 2200/168; B23C 2210/168; B23C 5/20; B23C 5/06; B23C 2210/0407
See application file for complete search history.

(56) References Cited

U.S. PATENT DOCUMENTS

2008/0273930 A1   11/2008  Svenningsson et al.
2010/0003090 A1*   1/2010  Johansson ............... B23C 5/202
                                                                                       407/113

FOREIGN PATENT DOCUMENTS

| CN | 101014439 A | 8/2007 | |
|---|---|---|---|
| EP | 2409801 A1 | 1/2012 | |
| EP | 3025814 A1 * | 6/2016 | ............ B23C 5/207 |
| JP | 06-091421 A | 4/1994 | |
| JP | 2008-512252 A | 4/2008 | |
| JP | 2010-012597 A | 1/2010 | |
| WO | 2006/041353 A1 | 4/2006 | |

* cited by examiner

CUTTING INSERT, CUTTING TOOL, AND METHOD FOR MANUFACTURING CUTTING-MACHINED PRODUCT

TECHNICAL FIELD

The present invention relates to a cutting insert used in cutting machining.

BACKGROUND

Milling tools are known in the art for cutting workpieces such as metals in cutting machining. For example, International Publication 2006/041353 (patent document 1) has disclosed a cutting insert used in a milling tool. The cutting insert disclosed in patent document 1 has an upper surface, a lower surface, a first side surface, a second side surface opposite the first side surface, a first cutting edge positioned on a portion on which the upper surface and the first side surface intersect, a second cutting edge positioned on a portion on which the upper surface and the second side surface intersect, and slots positioned on the lower surface and sandwiched by a plurality of protrusions. The plurality of protrusions extend parallel to each other from one side of the opposite second side surface to the other side. Patent document 1 represents an attempt to securely fix the cutting insert to a holder by means of the slots sandwiched by these protrusions.

When viewed from a side of the lower surface, the cutting insert disclosed in patent document 1 has the following feature: the angle between the second cutting edge and an imaginary extension line of the protrusion is equal to the angle between a ridge line on which the opposite second side surface and the lower surface intersect and the imaginary extension line of the protrusion.

Given that the above angles are equal, when these angles are relatively small, securely fixing the cutting insert to a holder may be difficult. Conversely, when these angles are relatively large, the cutting insert can be securely fixed to the holder. However, when the angles are relatively large, performing slope machining and the like may be difficult.

SUMMARY

Based on an embodiment, a cutting insert has the following parts: an upper surface; a lower surface; a side surface, having a first surface and a second surface disposed opposite each other between the upper surface and the lower surface; and a first cutting edge, positioned on at least a part of a portion on which the upper surface and the first surface intersect. the lower surface has a plurality of slots extending from a side of the first surface to a side of the second surface. In addition, when viewed from a side of the lower surface, if the angle between a ridge line on which the upper surface and the first surface intersect and an imaginary extension line of the plurality of slots is defined as θ1, and the angle between a ridge line on which the lower surface and the first surface intersect and the imaginary extension line is defined as θ2, then θ2>θ1.

EMBODIMENTS

A cutting insert 1 (hereinafter also referred to as the insert 1) of an embodiment is described below in detail with reference to the accompanying drawings. For ease of description, each of the following accompanying drawings referred to briefly shows only main components required for describing an embodiment. Therefore, the insert 1 disclosed below can have a constituent component that is not shown in the referred accompanying drawings. In addition, the sizes of the components in the accompanying drawings do not accurately show the sizes of the actual constituent components nor size ratios of the components.

Figure 1:
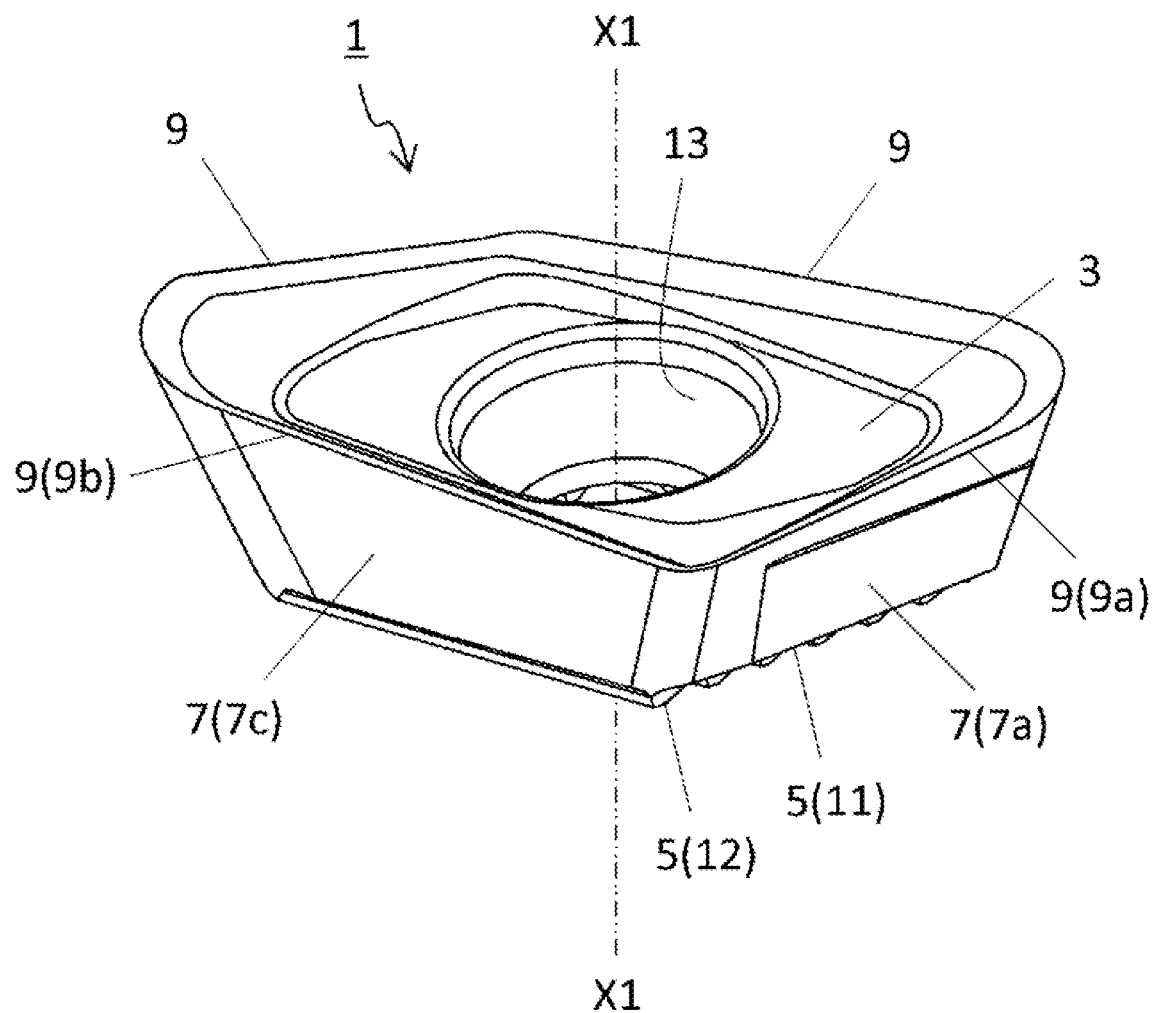
FIG. 1 is a perspective view of a cutting insert of an embodiment.

As shown in FIG. 1, the insert 1 of this embodiment has an upper surface 3, a lower surface 5 positioned opposite the upper surface 3, a side surface 7 positioned between the upper surface 3 and the lower surface 5, and a cutting edge 9 positioned at a ridge line on which the upper surface 3 and the side surface 7 intersect.

Figure 2:
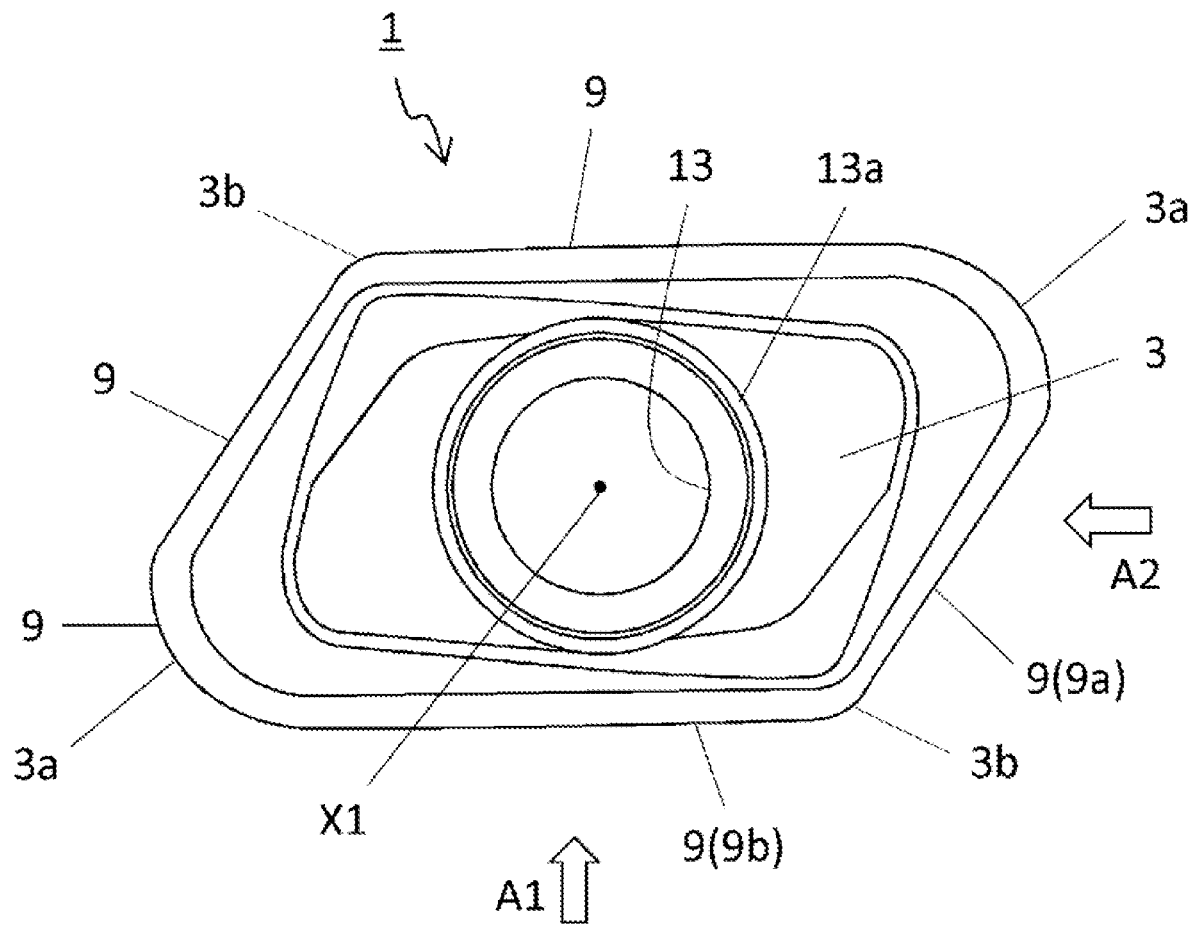
FIG. 2 is a front view of the cutting insert shown in FIG. 1 and viewed from a side of an upper surface.

As shown in FIG. 2, the upper surface 3 has a polygonal shape having a plurality of corners and sides. The upper surface 3 of this embodiment has a substantially quadrangular shape, and therefore has four corners and four sides. More specifically, the upper surface 3 of this embodiment is substantially parallelogram-shaped. Therefore, when viewed from the front, the upper surface 3 of this embodiment has a central axis X1 as the center and a rotational symmetry of 180° thereabout.

It should be noted that the polygonal shape does not indicate a strictly polygonal shape. For example, none of the four corners of the upper surface 3 of this embodiment are exact corners; the four corners are rounded in shape when viewed from the front. In addition, the four sides may not be straight lines in the strict sense.

In an embodiment shown in FIG. 2, the four sides include two long sides and two short sides. In addition, the four corners include two first corners 3a each having a relatively large radius of curvature and two second corners 3b each having a relatively small radius of curvature. As shown in FIG. 2, the two first corners 3a and the two second corners 3b are positioned on diagonal lines of the upper surface 3 respectively.

The lower surface 5 is positioned opposite the upper surface 3 and is smaller than the upper surface 3. The lower surface 5 can be configured to serve as a mounting seat surface facing a recess of a holder when the insert 1 is mounted on the holder. Because the upper surface 3 of this embodiment is substantially a parallelogram, the lower surface 5 of this embodiment is also substantially a parallelogram. The size of the lower surface 5 can also be the same as the size of the upper surface 3.

The shapes of the upper surface 3 and the lower surface 5 are not limited to those mentioned above. In the insert 1 of this embodiment, the shapes of the upper surface 3 and the lower surface 5 are substantially quadrangular; however, for example, the upper surface 3 and the lower surface 5 can also be triangular, pentagonal, hexagonal, or octagonal.

Figure 4:
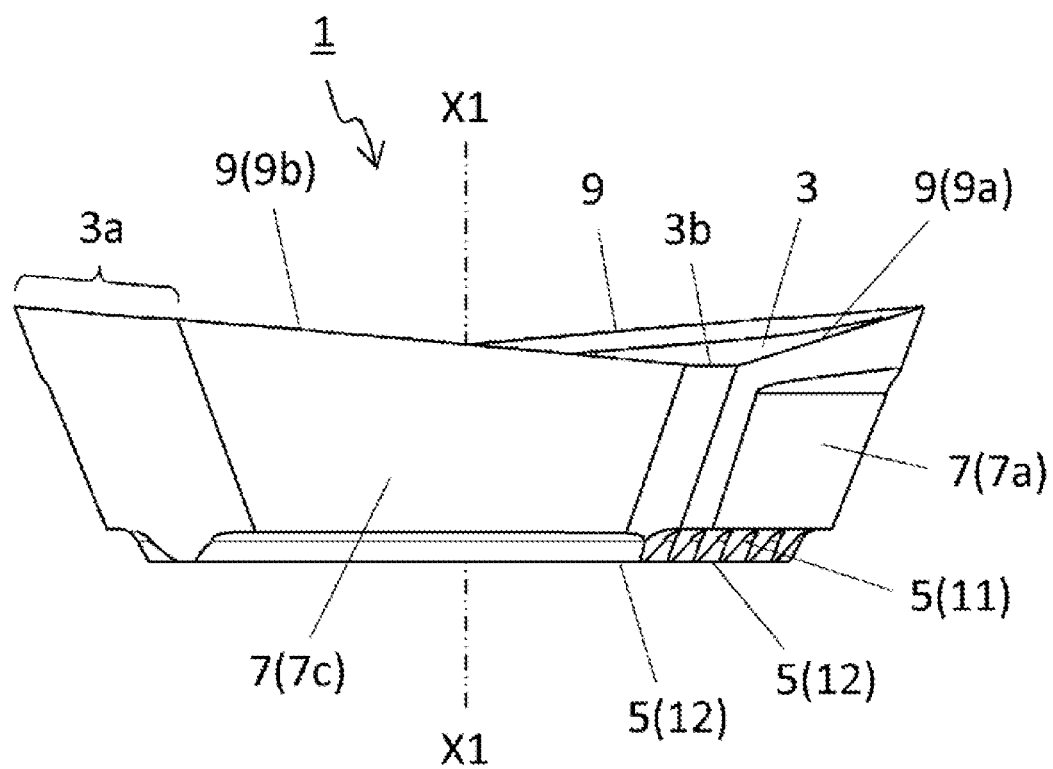
FIG. 4 is a side view of the cutting insert shown in FIG. 2 and viewed in an direction A1.
Figure 5:
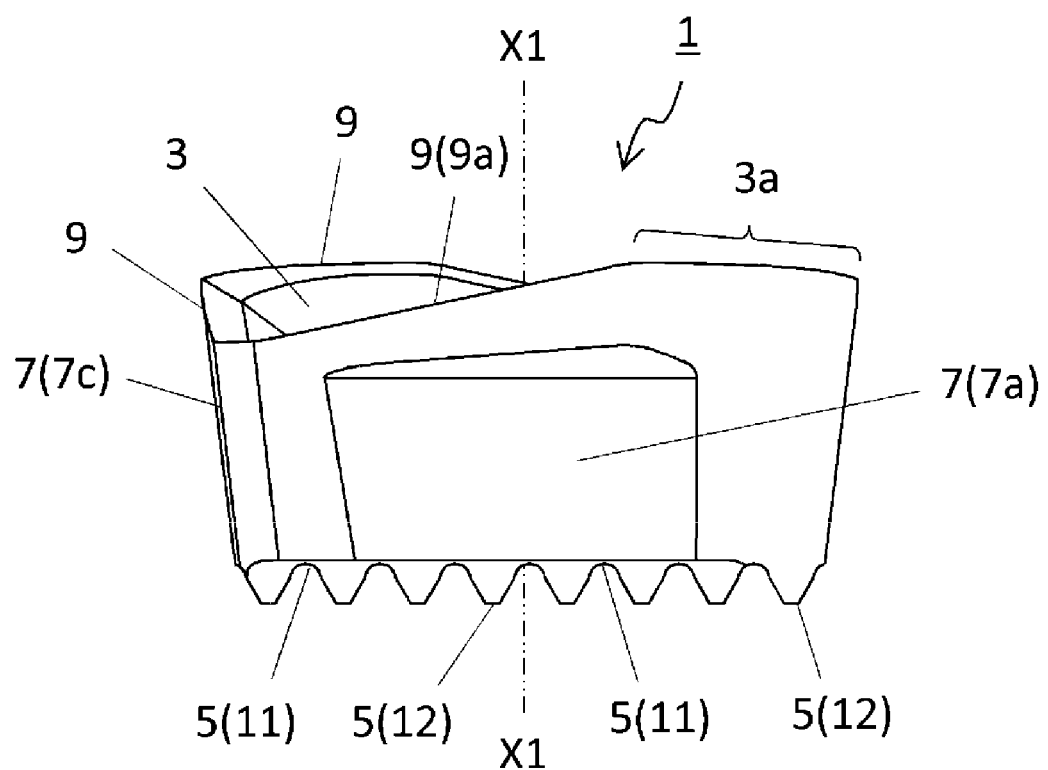
FIG. 5 is a side view of the cutting insert shown in FIG. 2 and viewed in an direction A2.

As shown in FIG. 4 and FIG. 5, the side surface 7 is connected to the upper surface 3 and the lower surface 5. The side surface 7 of this embodiment has a first surface 7a and a second surface 7b disposed opposite each other and respectively connected to the two short sides of the upper surface 3. In this embodiment, because the lower surface 5 is smaller than the upper surface 3, the side surface 7 is inclined increasingly close to the central axis X1 from a side of the upper surface 3 to a side of the lower surface 5.

When viewed from the front, the maximum width of the upper surface 3 of the insert 1 of this embodiment is 6-25 mm. In addition, the height from the lower surface 5 to the upper surface 3 is 1-10 mm. The height from the lower surface 5 to the upper surface 3 refers to the length between an upper end of the upper surface 3 and a lower end of the lower surface 5 in a direction parallel to the central axis X1.

It should be noted that the structures of the upper surface 3, the lower surface 5, and the side surface 7 are not limited to the structures mentioned above. For example, the lower surface 5 has the same shape as the upper surface 3, and in a top and perspective view, an outer periphery of the lower surface 5 may overlap an outer periphery of the upper surface 3. In this case, the side surface 7 is configured to be orthogonal to the lower surface 5.

As shown in the accompanying drawings such as FIG. 1, the cutting edge 9 is provided on a ridge line on which the upper surface 3 and the side surface 7 intersect. In this case, the cutting edge 9 may be provided on the entire ridge line on which the upper surface 3 and the side surface 7 intersect, or the cutting edge 9 may be provided on only a part of the ridge line on which the upper surface 3 and the side surface 7 intersect. The cutting edge 9 can be used to cut a workpiece in cutting machining. The cutting edge 9 of this embodiment has a first cutting edge 9a provided on at least a part of a ridge line on which the upper surface 3 and the first surface 7a intersect. In other words, the first cutting edge 9a is provided on the short side of the upper surface 3.

Figure 3:
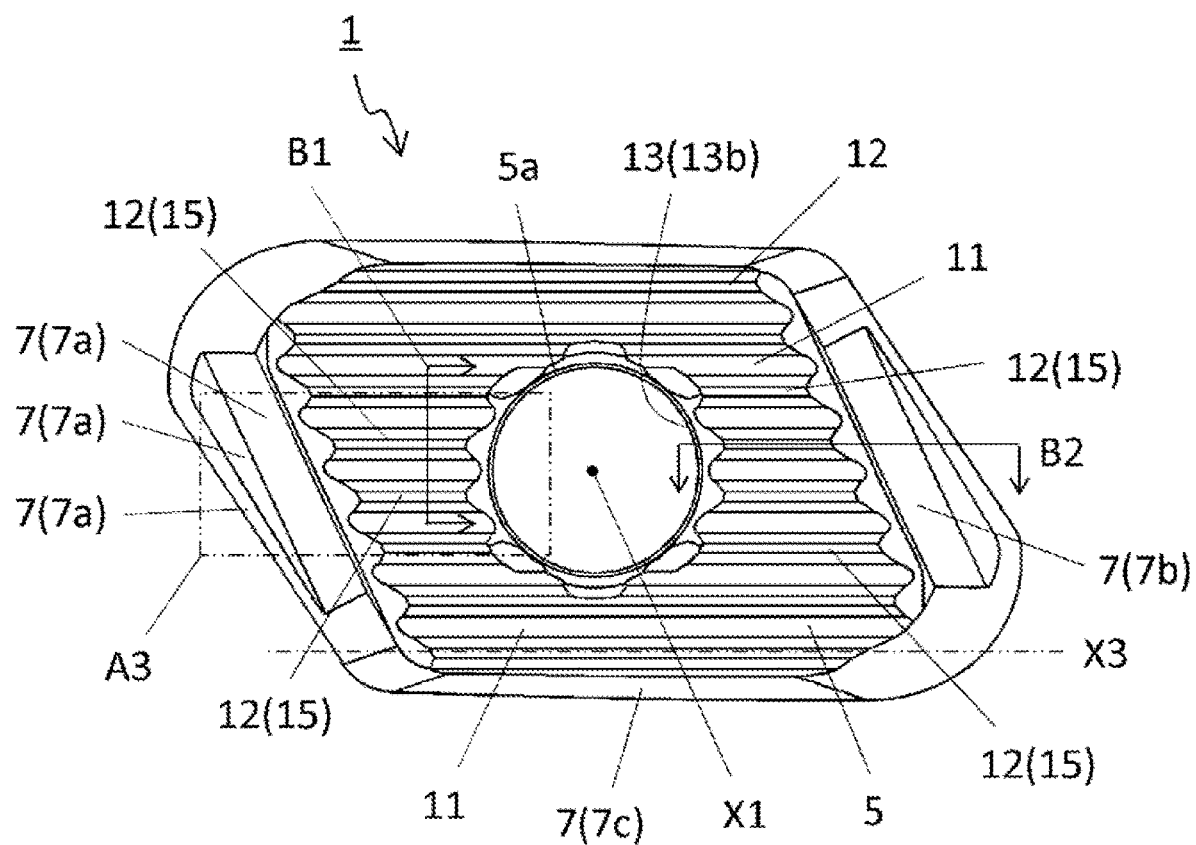
FIG. 3 is a front view of the cutting insert shown in FIG. 1 and viewed from a side of a lower surface.
Figure 6:
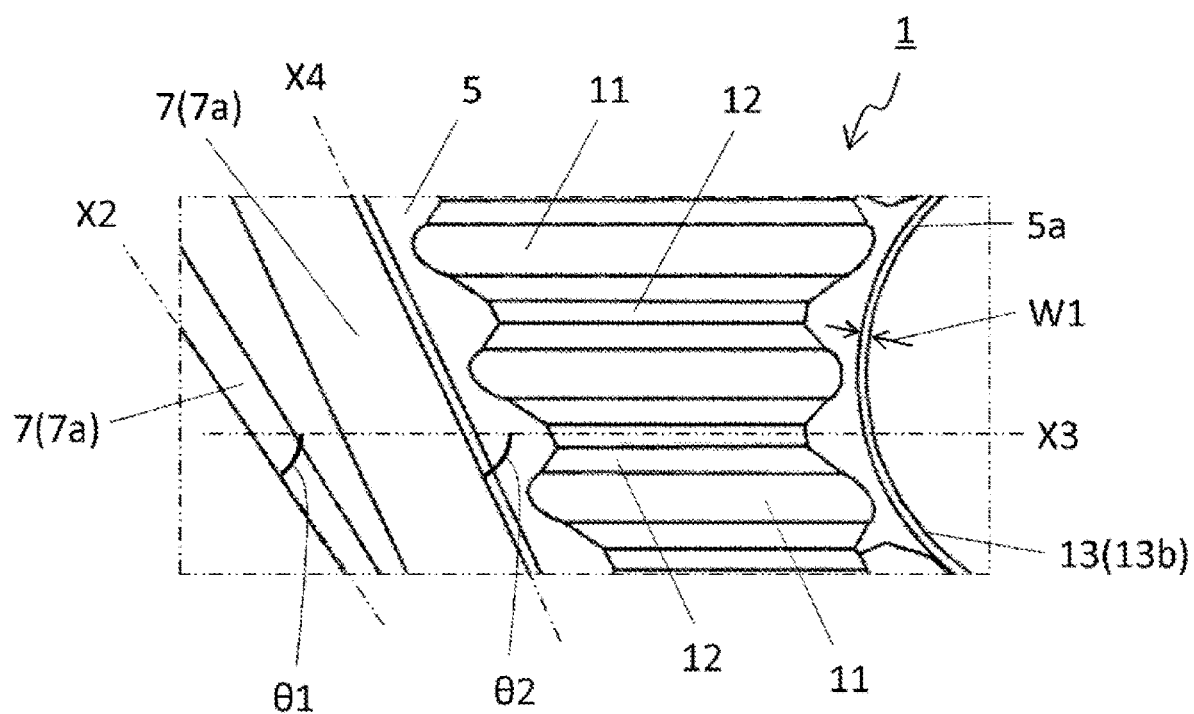
FIG. 6 is an enlarged view of a region A3 shown in FIG. 3.

As shown in FIG. 3, the lower surface 5 has a plurality of slots 11 extending from a side of the first surface 7a to a side of the second surface 7b. Because the lower surface 5 has the plurality of slots 11, the insert 1 is easily securely fixed to the holder. In addition, when viewed from the side of the lower surface 5, namely, when the lower surface 5 is viewed from the front, if, as shown in FIG. 6, the angle between the ridge line X2 on which the upper surface 3 and the first surface 7a intersect and an imaginary extension line X3 of the plurality of slots 11 is defined as θ1, and the angle between a ridge line X4 on which the lower surface 5 and the first surface 7a intersect and the imaginary extension line X3 is defined as θ2, then θ2>θ1.

In this way, θ2 is not equal to θ1, but is greater than θ1, thereby preventing the case in which θ2 becomes overly small is prevented. Therefore, when θ1 is reduced in order to perform slope machining and the like, θ2 may also be increased. Therefore, the cutting insert 1 can perform the slope machining and the like, and can be securely fixed to the holder.

In an embodiment shown in FIG. 3, the lower surface 5 has a plurality of protrusions 12 extending from the side of the first surface 7a to the side of the second surface 7b. Therefore, it can be considered that the plurality of slots 11 are positioned between the plurality of protrusions 12. In addition, in other words, it can be considered that the plurality of protrusions 12 are positioned between the plurality of slots 11.

Figure 7:
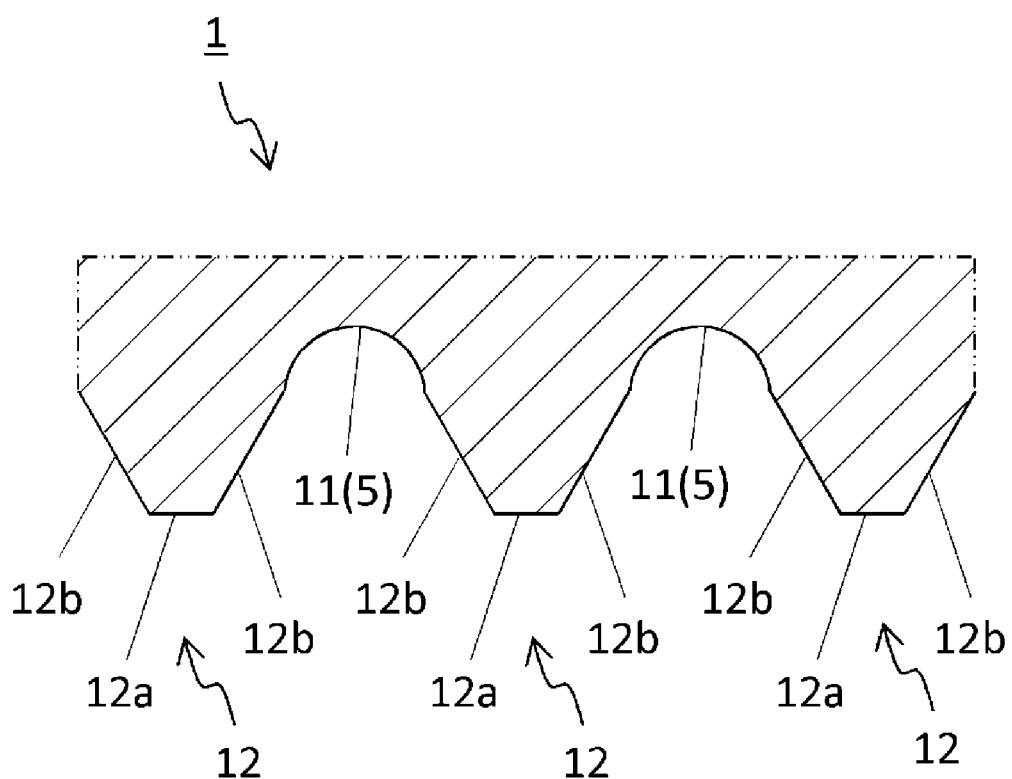
FIG. 7 is a cross-sectional view of a cross section B1 of the cutting insert shown in FIG. 3.

Each of the plurality of protrusions 12 extends from the side of the first surface 7a to the side of the second surface 7b; in an embodiment shown in FIG. 3, the plurality of protrusions are parallel to each other. In an embodiment shown in FIG. 7, in a cross section orthogonal to an extension direction of the protrusion 12, the protrusion 12 includes a flat top portion 12a and two inclined flat surfaces 12b respectively connected to two ends of the top portion 12a.

When the top portion 12a of the protrusion 12 is a flat surface extending from the side of the first surface 7a to the side of the second surface 7b, the plurality of protrusions 12 are not prone to interfere with the holder. Therefore, the load is not prone to concentrate on the top portion 12a of the protrusion 12.

Figure 8:
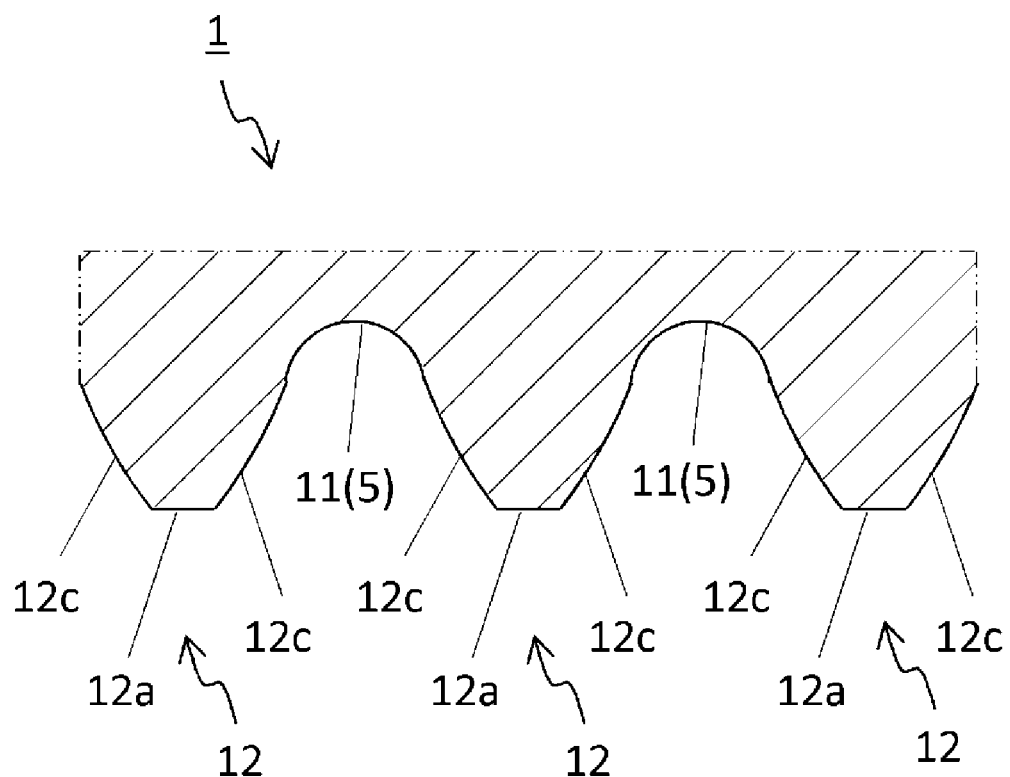
FIG. 8 is a cross-sectional view of a first variant embodiment of the cutting insert shown in FIG. 7.
Figure 9:
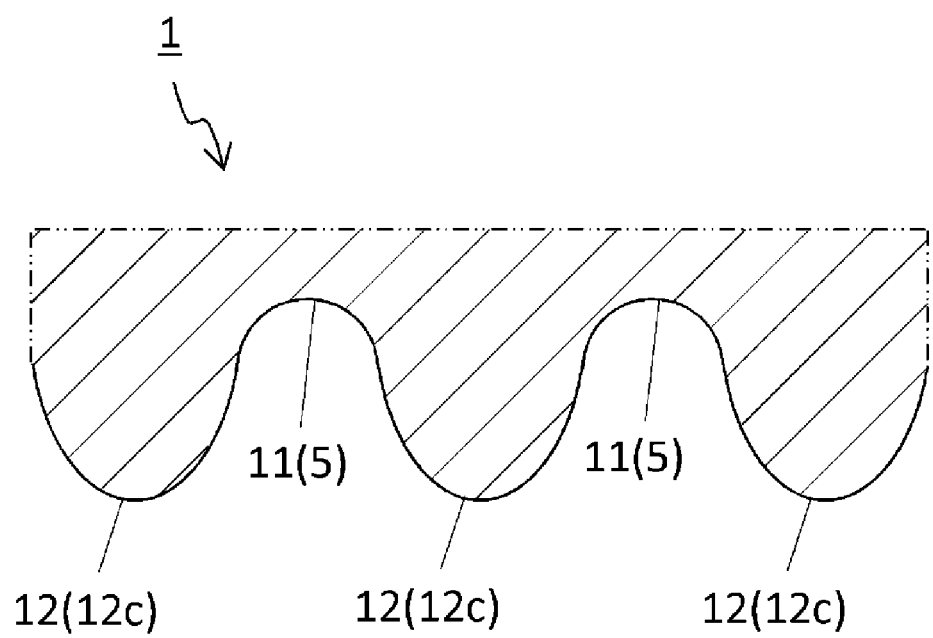
FIG. 9 is a cross-sectional view of a second variant embodiment of the cutting insert shown in FIG. 7.

It should be noted that the shape of the protrusion 12 is not limited to a specific structure; for example, as shown in FIG. 8, the protrusion 12 may include a flat top portion 12a and two protruding curved surfaces 12c respectively connected to two ends of the top portion 12a; in addition, as shown in FIG. 9, the protrusion 12 may be a protruding curved surface 12c.

As in an embodiment shown in FIG. 1, the insert 1 may also have a through-hole 13 extending from the upper surface 3 to the lower surface 5. It should be noted that the through-hole 13 of this embodiment extends from the center of the upper surface 3 to the center of the lower surface 5. Therefore, in this embodiment, an extension direction of the through-hole 13 is parallel to the central axis X1.

The through-hole 13 can serve as a hole into which a screw is inserted when the insert 1 is securely fixed to the holder through a screw thread. It should be noted that the method for fixing the insert 1 to the holder is not limited to the above secure fixing through a screw thread. For example, when the insert 1 is fixed to the holder by means of a fastening member or a rod, the through-hole 13 can also be used.

An opening portion of the through-hole 13 on the upper surface 3 is defined as a first opening portion 13a, and an opening portion of the through-hole 13 on the lower surface 5 is defined as a second opening portion 13b. In this way, when viewed from the side of the lower surface 5, the plurality of slots 11 may be connected to the second opening portion 13b; alternatively, as in an embodiment shown in FIG. 6, the plurality of slots 11 may be separated from the second opening portion 13b. When the plurality of slots 11 are separated from the second opening portion 13b, the durability of the insert 1 can be improved.

The reasons are as follows: when the insert 1 is securely fixed to the holder through a screw thread, a heavy load is prone to be applied to a position near the second opening portion 13b; when the plurality of slots 11 are separated from the second opening portion 13b and the insert 1 is securely fixed to the holder through a screw thread, the load applied to the slot 11 is easily distributed in a relatively large range of the slot 11.

In addition, when viewed from the side of the lower surface 5, the lower surface 5 has a flat first region 5a surrounding the second opening portion 13b, and when the periphery of the second opening portion 13b on the lower surface 5 does not have an uneven shape, the strength of the lower surface 5 around the second opening portion 13b can be improved. Therefore, the durability of the insert 1 can be further improved.

Specifically, when the width W1 in a radial direction of the through-hole 13 in the first region 5a is constant, a load applied to the first region 5a is easily distributed, and therefore the strength of the first region 5a can be improved. Therefore, the durability of the insert 1 can be further improved. It should be noted that the above constant width is not required to be strictly constant, as long as a minimum value of the width in the radial direction of the through-hole 13 in the first region 5a is equal to or greater than 90% of a maximum value of the width.

Figure 10:
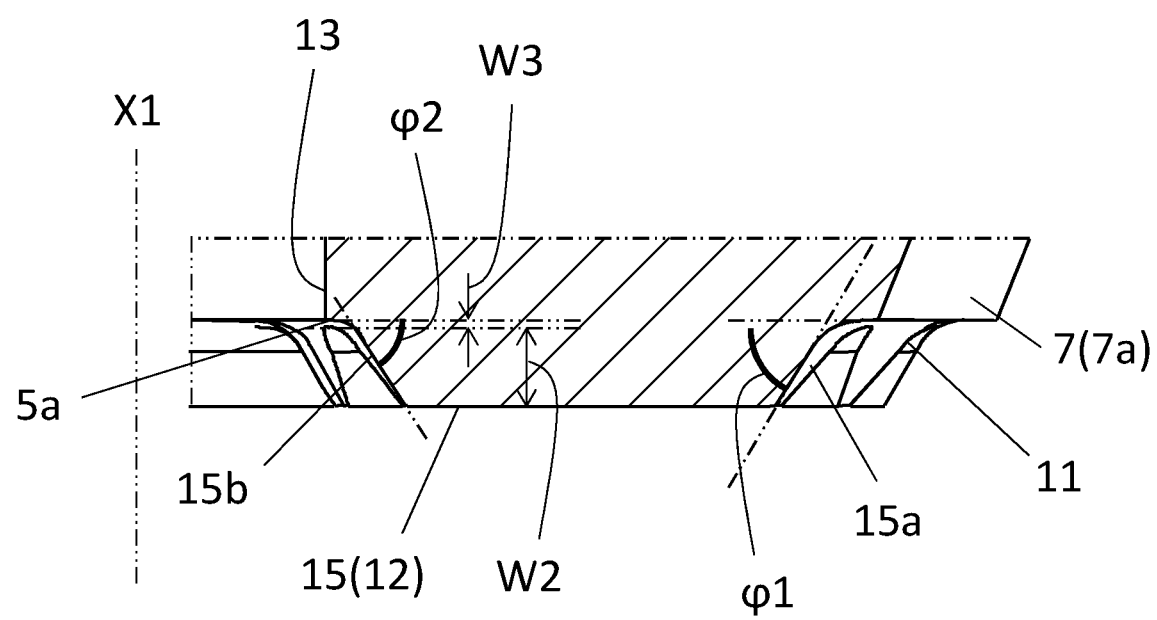
FIG. 10 is a cross-sectional view of a cross section B2 of the cutting insert shown in FIG. 3.

In addition, the plurality of protrusions 12 protrude downwards relative to the first region 5a; as shown in FIG. 10, in the extension direction of the through-hole 13, namely, in the direction of the central axis X1, when the width W2 from an upper end of the protrusion 12 to a lower end of the protrusion 12 is greater than the width W3 from the first region 5a to the lower end of the protrusion 12, the load applied to the first region 5a is easily transferred to the protrusion 12. Therefore, the durability of the first region 5a can be improved.

When viewed from the side of the lower surface 5, each of the plurality of protrusions 12 extends from the side of the first surface 7a to the side of the second surface 7b; in addition, at least one of the plurality of protrusions 12 may extend from the side of the first surface 7a to the through-hole 13. Herein, the protrusion 12 extending from the side of the first surface 7a to the through-hole 13 is defined as a first protrusion 15.

In this case, in a cross section parallel to the extension direction of the through-hole 13 and including the first protrusion 15, the first protrusion 15 may also have a first inclined surface 15a positioned on an end portion on the side of the first surface 7a and a second inclined surface 15b positioned on an end portion on a side of the through-hole 13.

A portion of the first protrusion 15 on which the first inclined surface 15a is provided is a portion to which a cutting load is easily applied when the first cutting edge 9a is used to perform cutting machining. When the first protrusion 15 has the first inclined surface 15a, a contact area between the insert 1 having the above portion to which a cutting load is easily applied and the holder is easily increased. Therefore, the insert 1 can be securely held by means of the holder.

A portion of the first protrusion 15 on which the second inclined surface 15b is provided is a portion to which a load is applied when the insert 1 is securely fixed to the holder through a screw thread as described above. When the first protrusion 15 has the second inclined surface 15b, the contact area between the insert 1 having the portion to which a cutting load is easily applied and the holder is easily increased. Therefore, the insert 1 can be securely held by means of the holder.

If the inclination angle of the first inclined surface 15a is defined as $\varphi 1$, and the inclination angle of the second inclined surface 15b is defined as $\varphi 2$, then $\varphi 1 > \varphi 2$; however, in an embodiment shown in FIG. 10, $\varphi 1 < \varphi 2$. A load applied to the insert 1 when the first cutting edge 9a is used to perform cutting machining is generally greater than a load applied to the insert 1 when the insert 1 is securely fixed to the holder through a screw thread; therefore, when $\varphi 1 < \varphi 2$, the insert 1 can be securely held by means of the holder.

In this embodiment, the side surface 7 further has a third surface 7c positioned between the first surface 7a and the second surface 7b. The third surface 7c is connected to a long side of the upper surface 3. In addition, the cutting edge 9 further has a second cutting edge 9b provided on at least a part of a ridge line on which the upper surface 3 and the third surface 7c intersect. In other words, the second cutting edge 9b is provided on the long side of the upper surface 3.

In this case, when viewed from the side of the lower surface 5, when the imaginary extension line X3 of the plurality of protrusions 12 is substantially parallel to the second cutting edge 9b, positional displacement of the insert 1 relative to the holder is not prone to occur. Because the first cutting edge 9a is provided on the short side of the upper surface 3, and the second cutting edge 9b is provided on the long side of the upper surface 3, the second cutting edge 9b is longer than the first cutting edge 9a.

Because the cutting load applied when the second cutting edge 9b is used to perform cutting machining is greater than the cutting load applied when the first cutting edge 9a is used to perform cutting machining, when viewed from the side of the lower surface 5, the positional displacement of the insert 1 is prone to occur in a direction orthogonal to the second cutting edge 9b than in a direction orthogonal to the first cutting edge 9a. However, when the imaginary extension line X3 is substantially parallel to the second cutting edge 9b, the positional displacement of the insert 1 relative to the holder in the direction orthogonal to the second cutting edge 9b is not prone to occur.

The insert 1 may be made from, for example, cemented carbide or cermet. The composition of the cemented carbide can be, for example, WC—Co, WC—TiC—Co, and WC—TiC—TaC—Co. WC, TiC, and TaC are hard particles, and Co is a binding phase.

In addition, the cermet is a sintered composite material composed of a metal and a ceramic component. Specifically, the cermet can be, for example, a titanium compound mainly containing titanium carbide (TiC) or titanium nitride (TiN).

Although not specifically shown in the drawings, the surface of the insert 1 can be covered with a coating by means of chemical vapor deposition (CVD) or physical vapor deposition (PVD). The composition of the coating can be, for example, titanium carbide (TiC), titanium nitride (TiN), titanium carbonitride (TiCN), and aluminum oxide ($Al_2O_3$).

<Cutting Tool>

Figure 11:
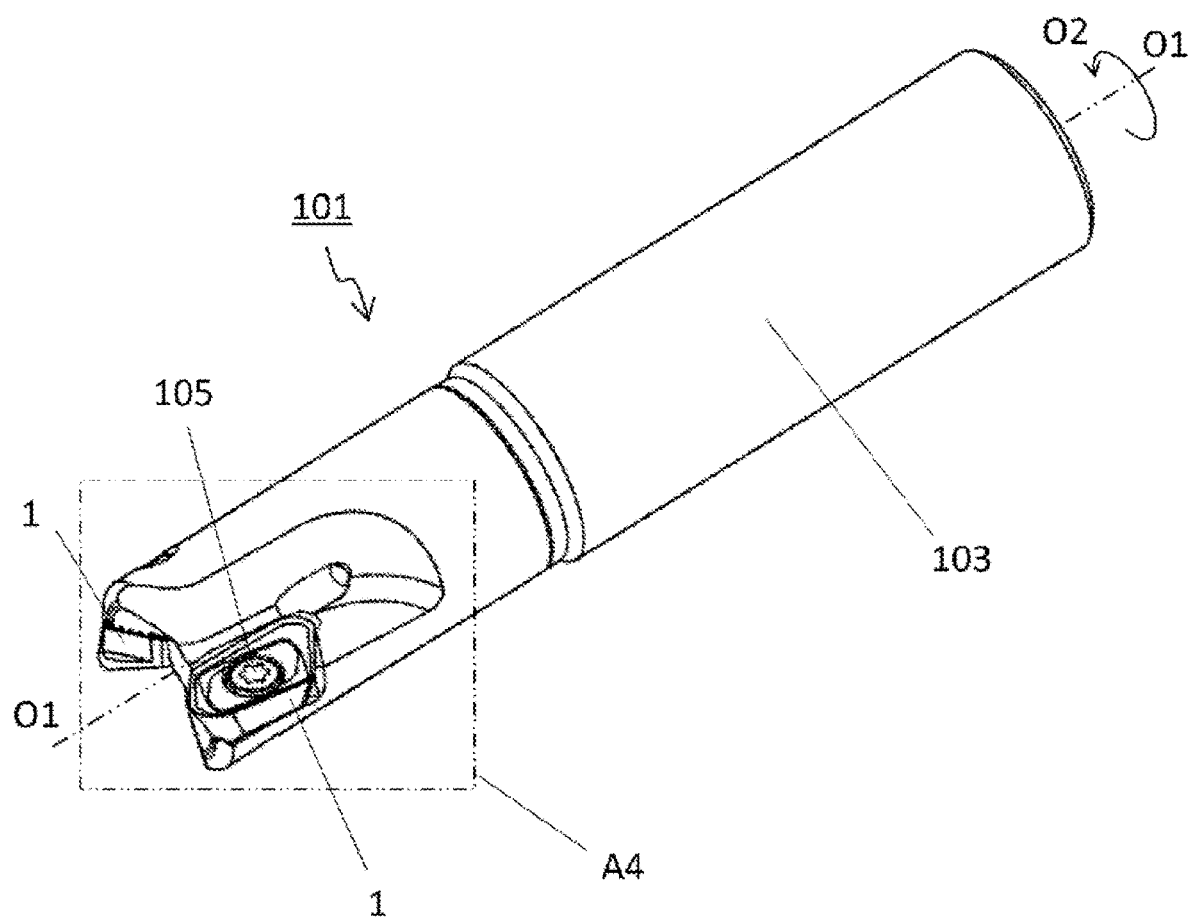
FIG. 11 is a perspective view of a cutting tool of an embodiment.
Figure 12:
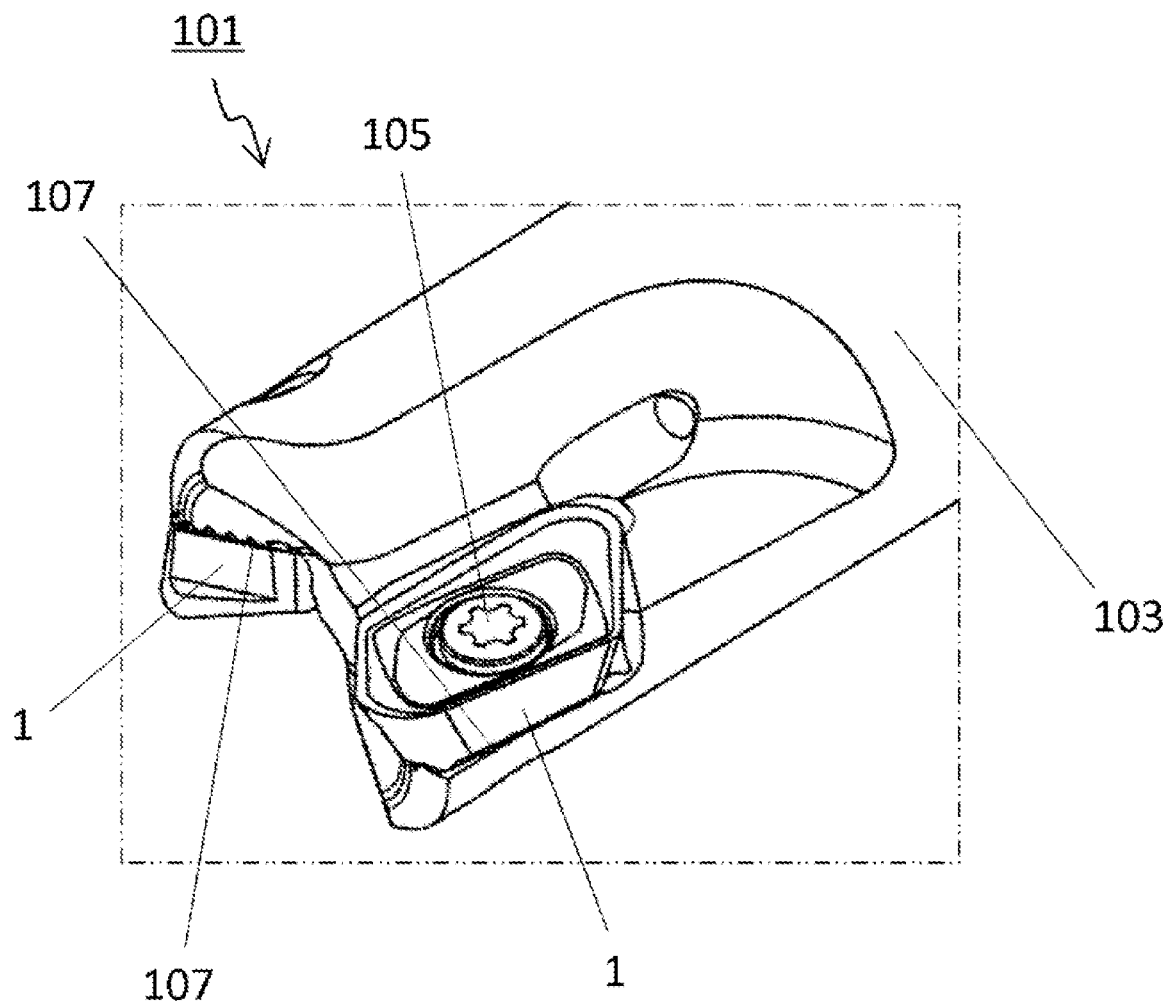
FIG. 12 is an enlarged view of a region A4 shown in FIG. 11.

As shown in FIG. 11 and FIG. 12, a cutting tool 101 of this embodiment has a holder 103, a plurality of cutting inserts 1, and a screw 105.

The holder 103 has a rotation axis O1. When a side of the holder 103 on which insert 1 is provided is defined as a front end side, and a side of the holder 103 opposite the front end side is defined as a rear end side, the holder 103 is a rod-shaped component extending from the front end side to the rear end side along the rotation axis O1. When cutting-machining is performed on a workpiece for manufacturing a cutting-machined product, the holder 103 rotates around the rotation axis O1. It should be noted that an arrow O2 in the drawings such as FIG. 11 indicates a rotation direction of the holder 103.

Hereinafter, a side close to the rotation axis O1 is defined as an inner peripheral side, and a side away from the rotation axis O1 is defined as an outer peripheral side. In addition, the direction from the rear end side to the front end side of the holder 103 is defined as a front end direction, and the direction from the front end side to the rear end side of the holder 103 is defined as a rear end direction.

The holder 103 may be made from, for example, steel, cast iron, or aluminum alloy. The size of the holder 103 is appropriately configured according to the size of the workpiece. For example, the length of the holder 103 in the direction of the rotation axis O1 is configured to be about 30-90 mm. In addition, the width (diameter) of the holder 103 in a direction orthogonal to the rotation axis O1 is configured to be about 20-500 mm.

A plurality of insert slots 107 (hereinafter also referred to as the recesses 107) are provided on the outer peripheral side of the front end side of the holder 103. The recess 107 is for mounting the insert 1, and before the insert 1 is mounted, the recess 107 is opened to the outer peripheral side of the front end side of the holder 103. The plurality of recesses 107 may be disposed at equal intervals in rotational symmetry about the rotation axis O1, or may be disposed at different intervals. When the plurality of recesses 107 are disposed at equal intervals, deviation of the load applied to the insert 1 mounted in each of the recesses 107 can be inhibited.

Because the holder 103 has the plurality of recesses 107, the holder 103 is not rod-shaped in a strict sense. The insert 1 mounted in the recess 107 is fixed to the holder 103 by means of the screw 105.

In this embodiment, as shown in FIG. 12, an example is shown: the holder 103 is provided with two recesses 107, and an insert 1 is provided in each of the two recesses 107. It should be noted that the number of recesses 107 and the number of inserts 1 mounted on the holder 103 are not limited to two. The numbers may also be, for example, one, three, or greater than three.

<Method for Manufacturing a Cutting-Machined Product>

Figure 13:
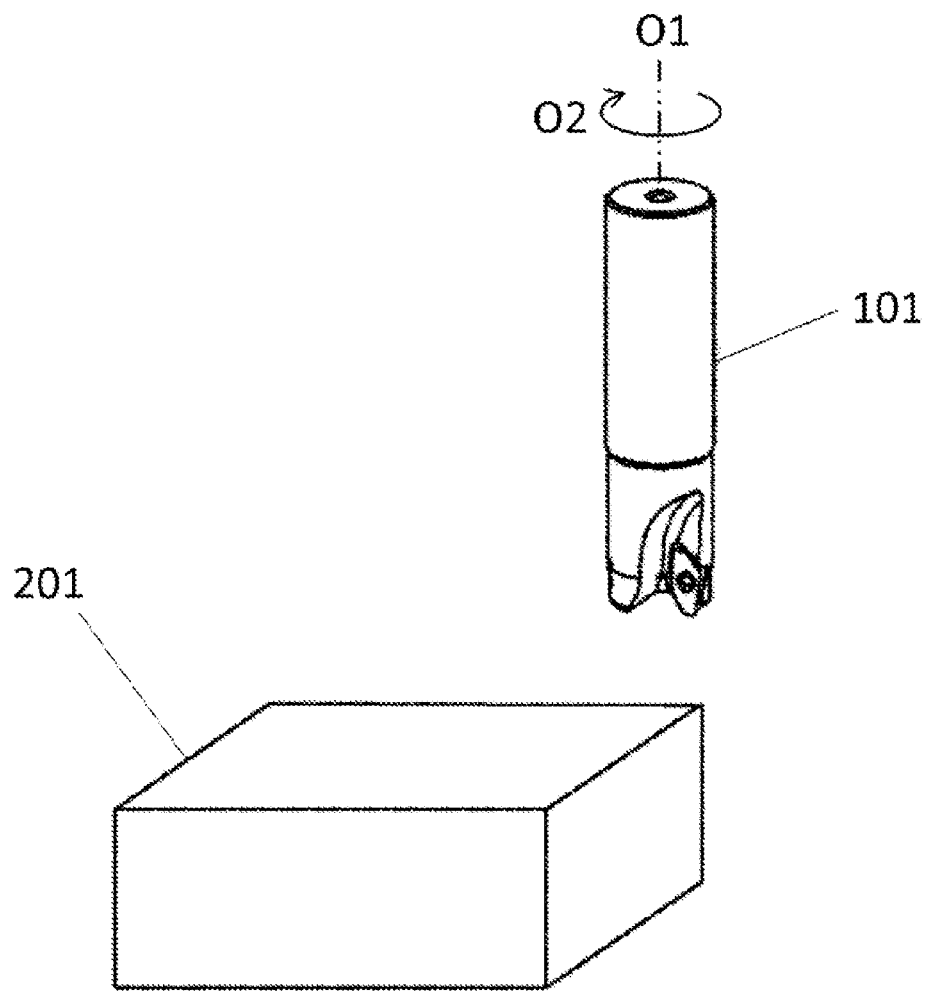
FIG. 13 is a schematic diagram of a process of a method for manufacturing a cutting-machined product of an embodiment.
Figure 14:
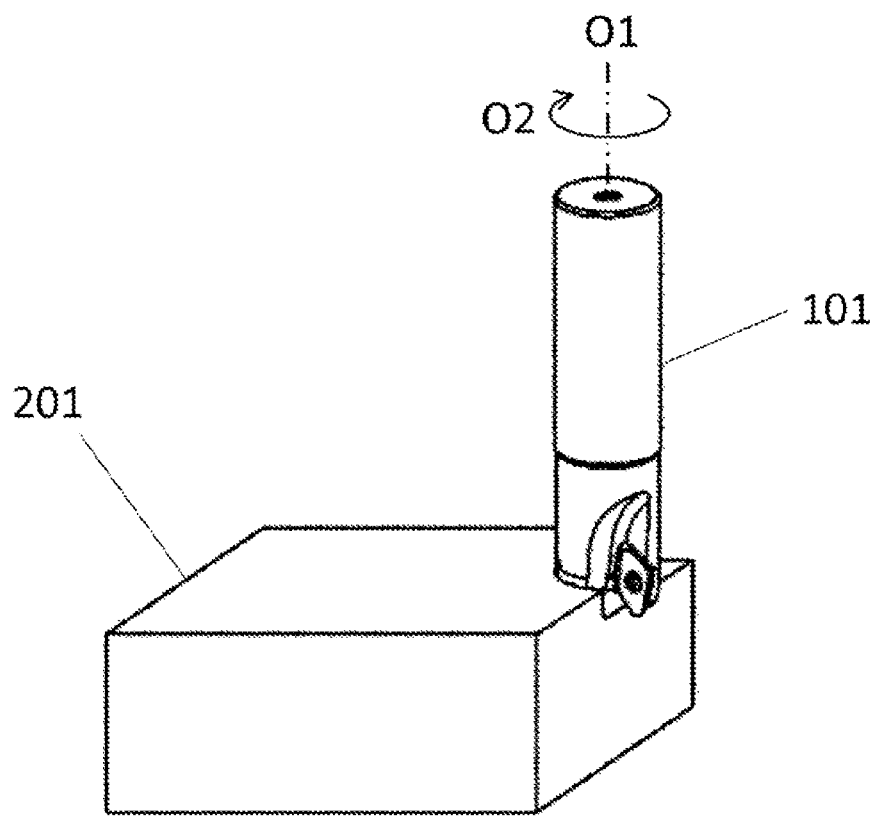
FIG. 14 is a schematic diagram of a process of a method for manufacturing a cutting-machined product of an embodiment.
Figure 15:
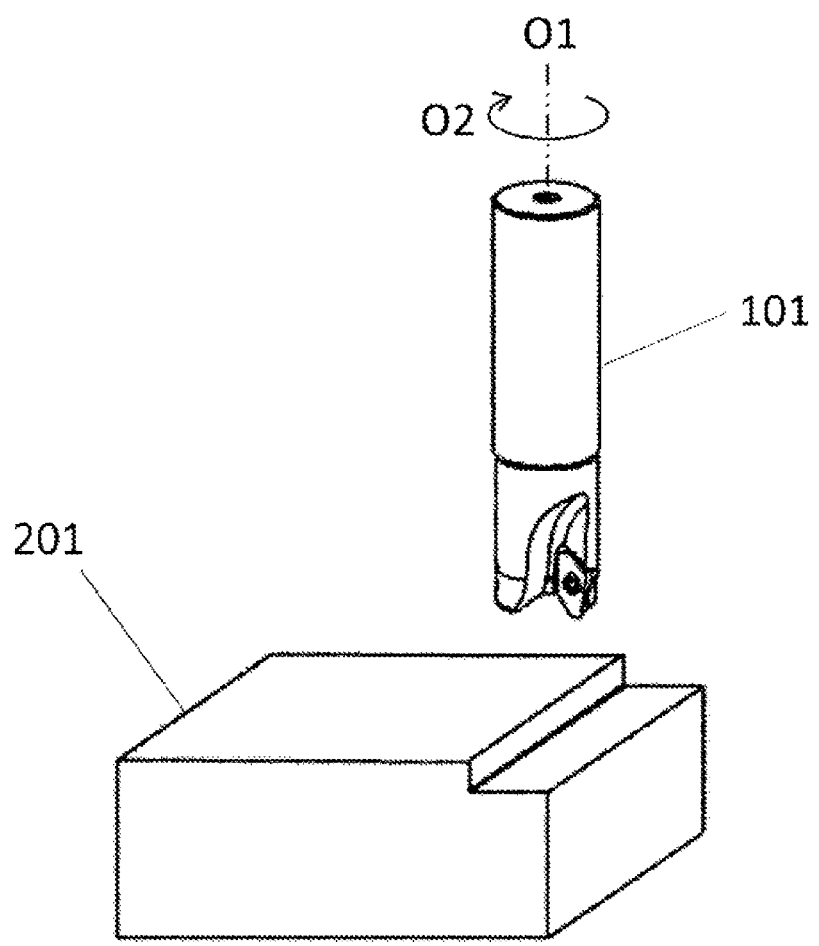
FIG. 15 is a schematic diagram of a process of a method for manufacturing a cutting-machined product of an embodiment.

A method for manufacturing a cutting-machined product according to an embodiment of the present invention is described below with reference to FIG. 13 to FIG. 15. FIGS. 13-15 show a method for manufacturing a cutting-machined product. It should be noted that the two-dot chain line in FIG. 13 to FIG. 15 shows the rotation axis O1 of the cutting tool. The cutting-machined product is manufactured by performing cutting machining on a workpiece 201. The cutting method of this embodiment includes the following processes, which are:

(1) rotating the cutting tool 101 represented by the above embodiment;
(2) causing the insert 1 of the rotating cutting tool 101 to contact with the workpiece 201; and
(3) moving the cutting tool 101 away from the workpiece 201.

More specifically, firstly, as shown in FIG. 13, the cutting tool 101 is caused to rotate around the rotation axis O1, while the cutting tool 101 is caused to relatively approach the workpiece 201. Next, as shown in FIG. 14, the cutting edge of the insert 1 is caused to contact with the workpiece 201, such that cutting is performed on the workpiece 201. Then, as shown in FIG. 15, the cutting tool 101 is moved away from the workpiece 201.

In this embodiment, the workpiece 201 is fixed, and the cutting tool 101 is caused to approach the workpiece 201. In addition, in FIG. 13 to FIG. 15, the workpiece 201 is fixed, and the cutting tool 101 is caused to rotate around the rotation axis O1. In addition, in FIG. 15, the workpiece 201 is fixed, and the cutting tool 101 is moved away. It should be noted that in each process under the cutting machining of the manufacturing method of this embodiment, fixing the workpiece 201 and moving the cutting tool 101 is merely one option, and is certainly not intended to be a limitation.

For example, in process (1), the workpiece 201 may also be caused to approach the cutting tool 101. Similarly, in process (3), the workpiece 201 may also be moved away from the cutting tool 101. When the cutting machining is continued, only the following process needs to be repeated: maintaining rotation of the cutting tool 101, and causing the cutting edge of the insert 1 to contact with different portions of the workpiece 201. When the used cutting edge is worn, the insert 1 only needs to be rotated around a central axis of the through-hole by 180 degrees such that an unused cutting edge is used. It should be noted that the workpiece 201 can be made from, for example, carbon steel, alloy steel, stainless steel, cast iron, or a non-ferrous metal.

It should be noted that the above embodiments disclose that the cutting tool 101 is used as a rotary tool in, for example, milling machining; however, the cutting tool 101 using the insert 1 of this embodiment is not limited to the above tool. For example, the cutting tool can also be a turning tool used in slot cutting machining and the like.

REFERENCE NUMERALS

1. Cutting Insert (Insert);
3. Upper Surface;
3a. First Angle;
3b. Second Angle;
5. Lower Surface;
5a. First Region;
7. Side Surface;
7a. First Surface;
7b. Second Surface;
7c. Third Surface;
9. Cutting Edge;
9a. First Cutting Edge;
9b. Second Cutting Edge;
11. Slots
12. Protrusion;
12a. Top Portion;
12b. Flat Surface;
12c. Protruding Curved Surface;
13. Through-hole;
13a. First Opening Portion;
13b. Second Opening Portion;
15. First Protrusion;
15a. First Inclined Surface;
15b. Second Inclined Surface;
101. Cutting Tool;
103. Holder;
105. Screw;
107. Recess;
201. Workpiece.

The invention claimed is:

1. A cutting insert, comprising:
an upper surface;
a lower surface;
a side surface located between the upper surface and the lower surface and comprising a first surface and a second surface disposed opposite each other; and
a first cutting edge positioned on a whole of an intersection of the upper surface and the first surface; wherein
the lower surface comprises a plurality of slots extending from a side of the first surface to a side of the second surface;
the plurality of slots comprises a first slot;
an angle between the first cutting edge and an imaginary extension line of the first slot in a plan view of the lower surface is defined as $\theta 1$,
an angle between a ridge line on which the lower surface and the first surface intersect and the imaginary extension line in the plan view of the lower surface is defined as $\theta 2$, and
$\theta 2$ is greater than $\theta 1$,
wherein the cutting insert further comprises a through-hole extending from the upper surface to the lower surface, and the plurality of slots are separated from an opening portion of the through-hole of the lower surface in the plan view,
wherein the lower surface further comprises a plurality of protrusions positioned between the plurality of slots;
the plurality of protrusions comprises:
a first protrusion extending from the side of the first surface to the through-hole in the plan view; and
the first protrusion comprises a first inclined surface positioned on an end portion on the side of the first surface and a second inclined surface positioned on an end portion on a side of the through-hole, and
wherein an inclination angle of the first inclined surface measured with respect to a virtual plane orthogonal to the axis of the through-hole is defined as $\varphi 1$, and an inclination angle of the second inclined surface with respect to the virtual plane orthogonal to the axis of the through-hole is defined as $\varphi 2$, and $\varphi 1$ is smaller than $\varphi 2$.

2. The cutting insert according to claim 1, wherein
the lower surface comprises a flat first region surrounding the opening portion in the plan view.

3. The cutting insert according to claim 2, wherein
the width of the first region in a radial direction of the through-hole is constant in the plan view.

4. The cutting insert according to claim 2, wherein
the lower surface further comprises a plurality of protrusions positioned between the plurality of slots;
the plurality of protrusions protrude downwards relative to the first region and comprises a first protrusion; and
in an extension direction of the through-hole, the width from an upper end of the first protrusion to a lower end of the first protrusion is greater than the width from the first region to the lower end of the first protrusion.

5. The cutting insert according to claim 1, wherein
the side surface further comprises a third surface positioned between the first surface and the second surface and a second cutting edge positioned on an intersection of the upper surface and the third surface intersect; and
the imaginary extension line is parallel to the second cutting edge in the plan view.

6. The cutting insert according to claim 1, wherein
the lower surface further comprises a plurality of protrusions positioned between the plurality of slots;
the plurality of protrusions comprises a first protrusion; and
the first protrusion comprises a flat top portions extending from a side of the first surface to a side of the second surface.

7. A cutting tool, comprising:
a holder comprising a front end and a recess positioned on a side of the front end; and
the cutting insert according to claim 1 positioned in the recess.

8. A method for manufacturing a cutting-machined product, comprising:
rotating the cutting tool according to claim 7;
causing the rotating cutting tool to contact with a workpiece; and
moving the cutting tool away from the workpiece.

9. The cutting insert according to claim 3, wherein
the lower surface further comprises a plurality of protrusions positioned between the plurality of slots;
the plurality of protrusions protrude downwards relative to the first region and comprises a first protrusion; and
in an extension direction of the through-hole, the width from an upper end of the first protrusion to a lower end of the first protrusion is greater than the width from the first region to the lower end of the first protrusion.

* * * * *